United States Patent [19]

Yamahara et al.

[11] Patent Number: 6,144,431

[45] Date of Patent: Nov. 7, 2000

[54] LIQUID CRYSTAL DISPLAY DEVICE HAVING AT LEAST ONE PHASE-DIFFERENT PLATE BETWEEN LC ELEMENT AND A POLARIZER WHEREIN THE PRINCIPAL REFRACTIVE INDICES OF SAID PHASE-DIFFERENT PLATE SATISFIES NA=NC>NB

[75] Inventors: Motohiro Yamahara, Osaka; Shigeaki Mizushima, Ikoma, both of Japan

[73] Assignee: Sharp Kabushiki Kaisha, Osaka, Japan

[21] Appl. No.: 08/947,127

[22] Filed: Oct. 8, 1997

[30] Foreign Application Priority Data

Oct. 17, 1996 [JP] Japan ..................................... 8-274880

[51] Int. Cl.[7] ......................... G02F 1/1335; G02F 1/1337
[52] U.S. Cl. ......................... 349/117; 349/118; 349/119; 349/96; 349/123
[58] Field of Search ..................................... 349/117, 118, 349/119, 96, 123

[56] References Cited

U.S. PATENT DOCUMENTS

| | | | |
|---|---|---|---|
| 4,813,770 | 3/1989 | Clerc et al. | 350/347 |
| 5,189,538 | 2/1993 | Arakawa | 359/73 |
| 5,426,524 | 6/1995 | Wada et al. | 359/73 |
| 5,506,706 | 4/1996 | Yamahara et al. | 359/73 |
| 5,528,400 | 6/1996 | Awakawa | 359/73 |
| 5,777,709 | 7/1998 | Xu | 349/120 |

FOREIGN PATENT DOCUMENTS

| | | |
|---|---|---|
| 55-600 | 1/1980 | Japan . |
| 56-097318 | 8/1981 | Japan . |
| 5-313159 | 11/1993 | Japan . |

*Primary Examiner*—William L. Sikes
*Assistant Examiner*—Julie Ngo
*Attorney, Agent, or Firm*—David G. Conlin; Peter J. Manus; Dike, Bronstein, Roberts & Cushman

[57] ABSTRACT

A liquid crystal display device includes: a liquid crystal display element formed by sealing a liquid crystal layer in a space between a pair of light transmitting substrates, the liquid crystal layer being formed by a liquid crystal material so that $\Delta n \cdot d$ that is a product of the index anisotropy $\Delta n$ of the liquid crystal material and a thickness d of the liquid crystal layer is more than 300 nm but less than 550 nm; a pair of polarizers disposed on both sides of the liquid crystal display element; and at least one piece of phase-difference plate between the liquid crystal display element and polarizers, wherein three principal refractive indices na, nb and nc of an index ellipsoid are related by na=nc>nb, the direction of one of na and nc is parallel to a surface of the phase-difference plate, and the index ellipsoid is inclined by rotating the direction of nb about an axis that is the direction of na or nc parallel to the surface of the phase-difference plate from a state parallel to a normal direction to the phase-difference plate surface into an inclined state. This structure eliminates a phase difference corresponding to a viewing angle of the liquid crystal display element, and achieves display of high quality images.

13 Claims, 7 Drawing Sheets

LIQUID CRYSTAL DISPLAY DEVICE HAVING AT LEAST ONE PHASE-DIFFERENT PLATE BETWEEN LC ELEMENT AND A POLARIZER WHEREIN THE PRINCIPAL REFRACTIVE INDICES OF SAID PHASE-DIFFERENT PLATE SATISFIES NA=NC>NB

FIELD OF THE INVENTION

The present invention relates to liquid crystal display devices, and more particularly relates to a liquid crystal display device having a screen whose viewing angle dependence is improved by a combination of a liquid crystal element and a phase-difference plate.

BACKGROUND OF THE INVENTION

Liquid crystal display devices using nematic liquid crystal display elements have been widely used as numerical-value-segment type liquid crystal display devices such as watches and desktop calculators. In recent years, such a liquid crystal display device is used as a display device of word processors, computers, navigation systems, etc.

In general, such a liquid crystal display device includes light transmitting substrates on which electrode lines, etc. are formed for switching on/off pixels. For example, in an active matrix liquid crystal display device, active elements such as thin film transistors (TFT) are formed on the substrate. The active elements function as a switching means for selectively driving pixel electrodes through which a voltage is applied to a liquid crystal layer. Additionally, in a liquid crystal display device capable of providing a color display, color filter layers, for example, red, green and blue filters, are placed on the substrate.

A liquid crystal display element of the above-mentioned liquid crystal display device is fabricated by sealing the liquid crystal layer in the space between a pair of light transmitting substrates. A transparent electrode layer and an alignment film are formed on each of the facing surfaces of the light transmitting substrates. Moreover, a pair of polarizers (polarizing plates) are disposed on both sides of the liquid crystal display element, respectively. The liquid crystal display element and the polarizers form a liquid crystal display device.

Twisted nematic liquid crystals are often used in a liquid crystal display device using the above-mentioned nematic liquid crystal display element. The alignment films formed on the facing surfaces of the pair of light transmitting substrates are rubbed in intersecting directions, respectively. Liquid crystal molecules which are sealed in the space between the light transmitting substrates are aligned according to the rubbing directions. The liquid crystal molecules are twisted in a spiral form from one of the substrates toward the other through the liquid crystal layer.

The display method of such a liquid crystal display device is classified into the following two known modes according to the twist angle of the nematic liquid crystals.

(a) The active-driving-type twisted nematic liquid crystal display mode (hereinafter referred to as the TN mode) in which nematic liquid crystal molecules are aligned in a 90°-twisted state.

(b) The multiplex-driving-type super-twisted nematic liquid crystal display mode (hereinafter referred to as the STN mode) in which nematic liquid crystal molecules are aligned in a twisted state with a twist angle of not smaller than 90°.

The latter display mode (b), namely the STN mode, suffers from a peculiar coloring phenomenon. Therefore, when providing a black-and-white display in the STN mode, the use of an optical compensation plate is considered to be effective. The STN modes using an optical compensation plate are mainly classified into the following two modes.

(b-1) The double layered super-twisted nematic liquid crystal display mode using a display-use liquid crystal cell, and a liquid crystal cell which is oriented with a twist angle in a direction opposite to that of the display-use liquid crystal cell.

(b-2) The film-stacked liquid crystal display mode.

If these two modes are compared to each other, the film-stacked liquid crystal display mode is found more advantageous in terms of the weight and cost, i.e., the film-stacked liquid crystal display mode allows a lighter weight and a lower cost.

Regarding the former display mode (a), namely the TN mode, two operation modes are selected by arranging the polarization directions of the polarizers to be orthogonal or parallel to each other. The TN mode is mainly classified into the following two types according to the operation modes.

(a-1) The normally black mode in which a pair of polarizers are disposed so that their polarizing directions are parallel to each other, and a black display is provided in a state (OFF state) in which a voltage is not applied to the liquid crystal layer.

(a-2) The normally white mode in which a pair of polarizers are disposed so that their polarizing directions cross each other at a right angle, and a white display is provided in the OFF state.

If these two modes are compared to each other, the latter normally white mode is found more advantages in terms of the display contrast, color reproducibility, and viewing angle dependence of display.

However, the TN mode has a problem that the contrast of a displayed image varies according to the viewing direction or angle of a viewer, i.e., high viewing angle dependence. Such a problem is caused by that the liquid crystal molecules possess index anisotropy $\Delta n$, and aligned in an inclined state with respect to the upper and lower substrates.

Figure 7:
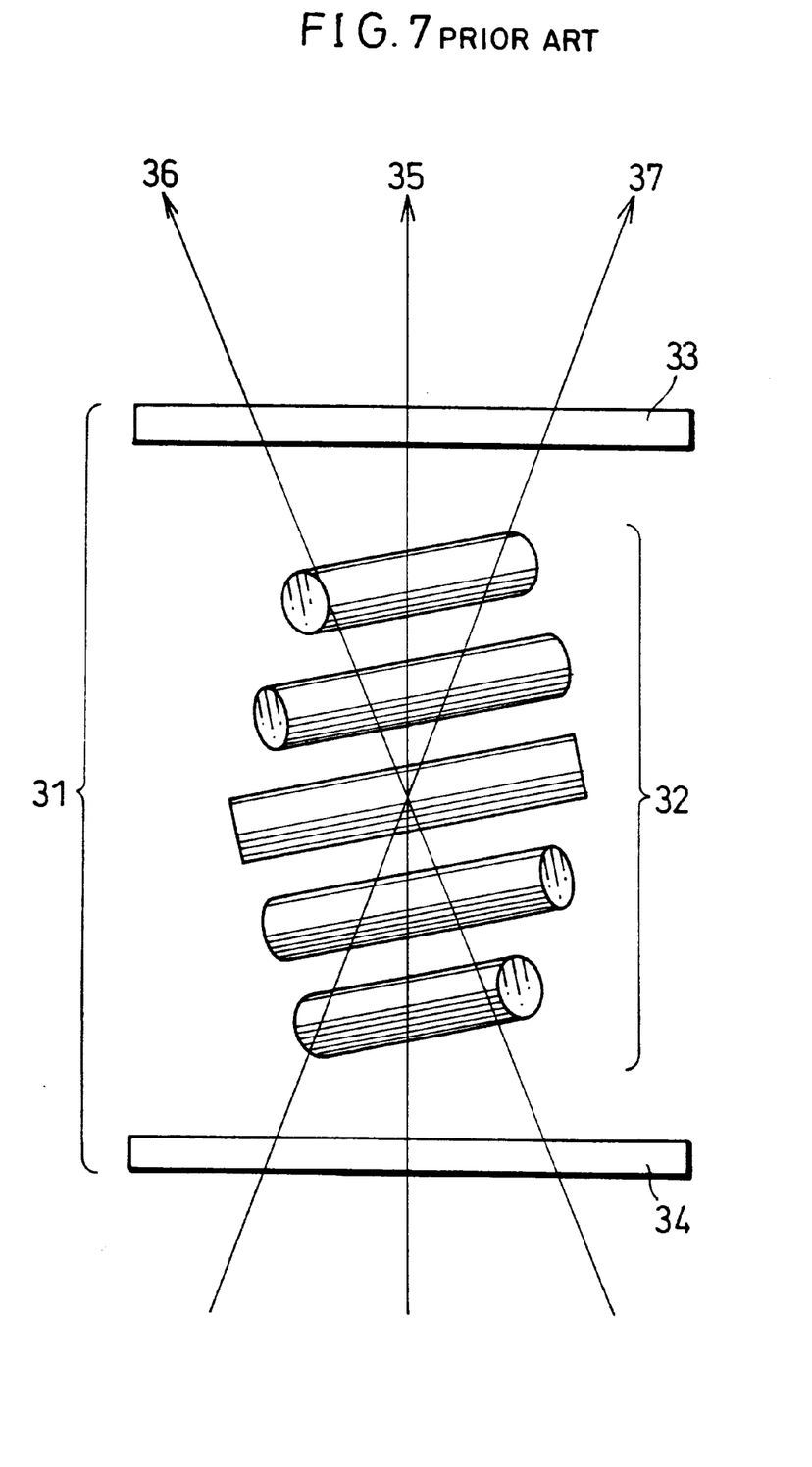
FIG. 7 is a depiction showing a twisted alignment of liquid crystal molecules in a TN liquid crystal display element.

For example, FIG. 7 shows a depiction of the cross section of a TN liquid crystal display element 31 when an half-tone display voltage is applied to the TN liquid crystal display element 31. It is seen from FIG. 7 that liquid crystal molecules 32 move into a slightly raised state.

In this case, in the liquid crystal display element 31, linearly polarized light 35 which passes in a normal direction to the surfaces of substrates 33•34 and linearly polarized light 36•37 which passes in an inclined direction with respect to the normal direction intersect the liquid crystal molecules 32 at different angles. Since the liquid crystal molecules 32 possess index anisotropy $\Delta n$, when the linearly polarized light 35•36•37 traveling in the above-mentioned directions passes through the liquid crystal molecules 32, an ordinary ray and an extraordinary ray are produced. The light transmitted through the liquid crystal display element 31 is converted into elliptically polarized light because of the phase difference between the ordinary ray and extraordinary ray. This conversion is the source of the viewing angle dependence.

Moreover, in an actual liquid crystal layer, the tilt angle of the liquid crystal molecules 32 differs between the vicinity of the intermediate position of the substrates 33•34 and the vicinity of the substrates 33•34. Furthermore, the liquid crystal molecules 32 are twisted 90° about an axis that is the normal direction to the substrates 33•34. Thus, the linearly polarized light 35·36·37 receives various birefringence effects according to the incident direction and angle, and shows complex viewing angle dependence.

The viewing angle dependence will be explained in detail below. When the viewing direction is inclined certain degrees from the normal direction toward a lower direction of the screen, i.e., a positive viewing direction, a phenomenon in which the displayed image is colored (hereinafter referred to the "coloring phenomenon) or a phenomenon in which black and white are switched over (hereinafter referred to as the "inverting phenomenon") is observed. On the other hand, when the viewing direction is inclined toward an upper direction of the screen, i.e., a negative viewing direction, the contrast is abruptly lowered.

In addition, the above-mentioned liquid crystal display device has a problem that the viewing angle is narrowed with an increase in the area of the screen. For example, when a large-area liquid crystal display screen is viewed from a position in front of the screen at a close distance, the color displayed in the upper part of the screen and the color in the lower part are sometimes seen in different colors due to the influence of the viewing angle dependence. This problem is caused by that the apparent angle in viewing the entire screen increases, and the same result as viewing the liquid crystal display screen from a further inclined direction is produced.

In order to improve the viewing angle dependence, it has been proposed to insert a phase-difference plate (phase-difference film) as an optical element having optical anisotropy between the liquid crystal display element and one of the polarizers (see, for example, Japanese laid-open patent applications, No. 000600/1980 (Tokukaisho 55-000600), and No. 097318/1981 (Tokukaisho 56-097318).

This proposed method improves the viewing angle dependence as follows. Linearly polarized light is converted into elliptically polarized light when passing through liquid crystal molecules having index anisotropy. The resulting light is caused to pass through the phase-difference plate provided on one or both sides of a liquid crystal layer having index anisotropy so as to compensate for the phase difference between an ordinary ray and an extraordinary ray that varies according to the viewing angle and reconvert the light into linearly polarized light. In this method, therefore, it is necessary to set up not only the characteristics of the phase-difference plate, but also the characteristics of the liquid crystal layer, i.e., the liquid crystal display element.

Then, as a method for further improving the viewing angle dependence, Japanese laid-open patent application, No. 313159/1993 (Tokukaihei 5-313159) proposes a liquid crystal display device using a phase-difference plate in which the direction of one of the principal refractive indices of an index ellipsoid is parallel to a normal direction to the surface of the phase-difference plate, and a liquid crystal element in which $\Delta n \cdot d$ is the product of $\Delta n$ ($=n_x-n_y$) and the cell thickness d (liquid crystal layer thickness) of the phase difference plate is within a range of from 200 nm and 500 nm, wherein the phase-difference plate is disposed between the liquid crystal display element and the polarizer.

In this liquid crystal display device, not only the characteristics of the phase-difference plate and the liquid crystal display element are set, but also the rubbing direction of an alignment film constituting the liquid crystal display element, the lagging axis direction of the phase-difference plate and the transmitting axis direction of the polarizer are made parallel to each other. This structure allows a further improvement of the viewing angle dependence of the liquid crystal display device.

Furthermore, a liquid crystal display device using a phase-difference plate in which the principal refractive index direction of the index ellipsoid is inclined with respect to the normal direction to the surface of the phase-difference plate has been proposed (see U.S. Pat. No. 5,506,706). This liquid crystal display device uses the following two kinds of phase-difference plates.

In one of the phase-difference plates, the direction of the minimum principal refractive index among three principal refractive indices of the index ellipsoid is parallel -to the surface of the phase-difference plate. The direction of one of the remaining two principal refractive indices is inclined an angle of θ with respect to the surface of the phase-difference plate. The direction-of the other principal refractive index is inclined an angle of θ with respect to the normal direction to the surface of the phase-difference, plate. In this phase-difference plate, the value of θ satisfies 20°≦θ≦70°.

In the other phase-difference plate, there is no index anisotropy within the surface of the phase-difference plate. The principal refractive index nb in the normal direction to the surface of the phase-difference plate, and the principal refractive indices na and nc parallel to the surface of the phase-difference plate satisfy the relationship na=nc>nb. Namely, this phase-difference plate has an optically negative uniaxial property. Moreover, the index ellipsoid is inclined by turning the direction of the principal refractive index nb clockwise or counterclockwise about an axis that is the direction of one of the principal refractive indices na and nc parallel to the surface of the phase-difference plate from a state parallel to the normal direction to the surface of the phase-difference plate to an inclined state.

As the former phase-difference plate, it is possible to use either an optically uniaxial plate or an optically biaxial plate. As the latter phase-difference plate, it is possible to use not only one phase-difference plate, but also a combination of two phase-difference plates wherein the inclined directions of the respective principal refractive indices nb with respect to the normal direction to the surfaces of the phase-difference plates form 90° together.

In a liquid crystal display device constructed by placing at least one piece of such a phase-difference plate between the liquid crystal display element and the polarizer, the viewing angle dependence is improved to a certain level.

However, in the method disclosed by the above-mentioned document, Japanese laid-open patent application No. 313159/1993 (Tokukaihei 5-313159) wherein the phase-difference plate in which the direction of one of the principal refractive indices of the index ellipsoid is parallel to the normal direction to the surface of the phase-difference plate is placed between the polarizer and the liquid crystal display element including a liquid crystal layer whose retardation $\Delta n \cdot d$ is set within a range of from 200 nm to 500 nm, the viewing angle dependence can be improved only in a certain direction of the screen, i.e., cannot be improved in every direction. Namely, this method faces its limitation.

Furthermore, in the method of using the phase-difference plate as disclosed in the above-mentioned document U.S. Pat. No. 5,506,706, the conditions are set so that the index ellipsoid is inclined. A liquid crystal display element which is formed by a liquid crystal material with index anisotropy $\Delta n$ of 0.08 and a liquid crystal layer with a thickness d of 4.5 $\mu$m, i.e., a liquid crystal element in which the value of retardation $\Delta n \cdot d$ of the liquid crystal layer is 360 nm, is used as one embodiment of the liquid crystal display element. However, this document does not provide more information about the liquid crystal display element and the polarizer between which the phase-difference plate is to be placed.

In the method of improving the viewing angle dependence by placing the phase-difference plate between the liquid crystal display element and the polarizer, it is necessary to set up not only the characteristics of the phase-difference plate, but also the characteristics of the liquid crystal display element. In this method, therefore, it is not clear that which range of Δn·d of the liquid crystal display element is to be used together with the phase-difference plate in order to achieve most effective compensation for a variation in the phase difference. Thus, the use of the above-mentioned phase-difference plate for a reduction of the viewing angle dependence of the liquid crystal display device has not produced satisfactory results.

SUMMARY OF THE INVENTION

In order to solve the above-mentioned problems, it is an object of the present invention to provide a liquid crystal display device capable of displaying high quality images by eliminating a contrast change and inverting and coloring phenomena that occur depending on an angle of viewing displayed images.

A liquid crystal display device of the present invention includes:

a liquid crystal display element formed by sealing a liquid crystal layer in a space between a pair of light transmitting substrates having transparent electrode layers and alignment films on their facing surfaces, the liquid crystal layer being formed by a liquid crystal material so that a value Δn·d that is a product of index anisotropy Δn of the liquid crystal material and a thickness d of the liquid crystal layer is more than 300 nm but less than 500 nm;

a pair of polarizers disposed on both sides of the liquid crystal display element; and at least one piece of phase-difference plate between the liquid crystal display element and the polarizers, wherein the phase-difference plate satisfies na=nc>nb where na, nb and nc represent three principal refractive indices of an index ellipsoid, the direction of one of the principal refractive indices na and nc is parallel to a surface of the phase-difference plate, and the index ellipsoid is inclined by rotating the direction of the principal refractive index nb clockwise or counter-clockwise about an axis that is the direction of the principal refractive index na or nc parallel to the surface of the phase-difference plate from a state parallel to a normal direction to the surface of the phase-difference plate into an inclined state.

In this structure, when linearly polarized light passes through the liquid crystal layer having a birefringence property, an ordinary ray and an extraordinary ray are produced. When the linearly polarized light is converted into an elliptically polarized light due to the phase difference between the ordinary ray and the extraordinary ray, if a phase-difference plate in which the principal refractive indices na, nb and nc are related by na=nc>nb and the minor axis of an index ellipsoid including the principal refractive index nb is inclined with respect to a normal direction to a surface of the phase-difference plate is placed between the liquid crystal layer and the polarizers, the phase difference between the ordinary ray and the extraordinary ray that varies according to the viewing angle is compensated by the phase-difference plate.

However, when the value of retardation Δn·d of the liquid crystal layer is not more than 300 nm or not less than 550 nm, the inverting phenomenon and a lowering of the contrast ratio occurs at some viewing angles. By setting the retardation Δn·d of the liquid crystal layer to a value which is more than 300 nm but less than 550 nm, it is possible to eliminate the phase difference in the liquid crystal display element that varies according to the viewing angle. It is thus possible to prevent the occurrence of a contrast change and the inverting and coloring phenomena in the right and left directions of liquid crystal display images depending on the viewing angle.

Accordingly, the above-mentioned structure can certainly compensate for a variation in the phase difference in the liquid crystal display element. Consequently, in a liquid crystal display device including such a phase-difference plate and a liquid crystal display element, since the contrast ratio of a black-and-white display is not affected by the viewing direction of a viewer, it is possible to prevent the inverting phenomenon, a lowering of the contrast ratio in the negative viewing direction and the coloring phenomenon, thereby achieving a significant improvement of the quality of displayed images on the liquid crystal display device.

Moreover, in the liquid crystal display device of the present invention, in order to compensate for a variation in the phase difference in the liquid crystal display element, it is necessary to place between the liquid crystal display element and the polarizers at least one piece of a phase-difference plate in which the direction of the principal refractive index nb is inclined with respect to a direction normal to a surface of the phase-difference plane, and at least the direction of one of the principal refractive indices na and nc of the index ellipsoid is inclined with respect to a direction parallel to the surface of the phase-difference plate.

For a fuller understanding of the nature and advantages of the invention, reference should be made to the ensuing detailed description taken in conjunction with the accompanying drawings.

DESCRIPTION OF THE PREFERRED EMBODIMENT

The following description will explain one embodiment of the present invention with reference to the drawings.

Figure 1A:
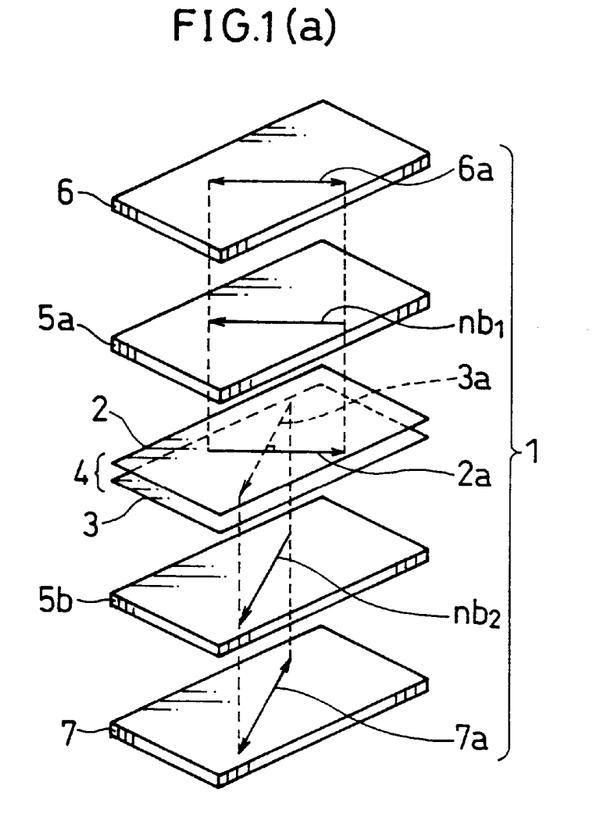
FIG. 1(a) is an exploded perspective view showing the structure of a liquid crystal display device according to one embodiment of the present invention.

FIG. 1(a) is an exploded perspective view showing the structure of a liquid crystal display device 1 of the present invention. The liquid crystal display device 1 includes a liquid crystal display element 4 produced by sealing a liquid crystal layer made of, for example, nematic liquid crystals in a space between a pair of glass substrates (light transmitting substrates) 2 and 3, a phase-difference plate 5a placed on one side of the liquid crystal element 4, a phase-difference plate 5b disposed on the other side, and a pair of polarizing plates (polarizers) 6 and 7 placed to sandwich the liquid crystal element 4 and the phase-difference plates 5a and 5b therebetween. Here, it is necessary to provide at least one of the phase-difference plates 5a and 5b.

A rubbing direction 2a of the glass substrate 2 constituting the liquid crystal element 4 and a rubbing direction 3a of the glass substrate 3 are arranged to cross each other at a right angle so that the liquid crystal molecules of the liquid crystal layer are aligned in an about 90°-twisted state.

Similarly, an absorption axis 6a of the polarizing plate 6 and an absorption axis 7a of the polarizing plate 7 are arranged to cross each other at a right angle. Thus, the liquid crystal display device 1 is constructed to perform a so-called normally white display mode in which light is allowed to pass and a white display is provided when a voltage is not applied to the liquid crystal display element 4.

If at least one of the phase-difference plates 5a and 5b is disposed to adjoin either the polarizing plate 6 or 7 between the polarizing plates 6 and 7, it is possible to compensate for the phase difference. Moreover, more than one piece of the phase-difference plates 5a and 5b can be provided between the liquid crystal display element 4 and the polarizing plate 6 or 7. In addition, a plurality or more than one piece of the phase-difference plate 5a or 5b can be provided between the liquid crystal display element 4 and the polarizing plate 6 and between the liquid crystal display element 4 and the polarizing plate 7.

Figure 1B:
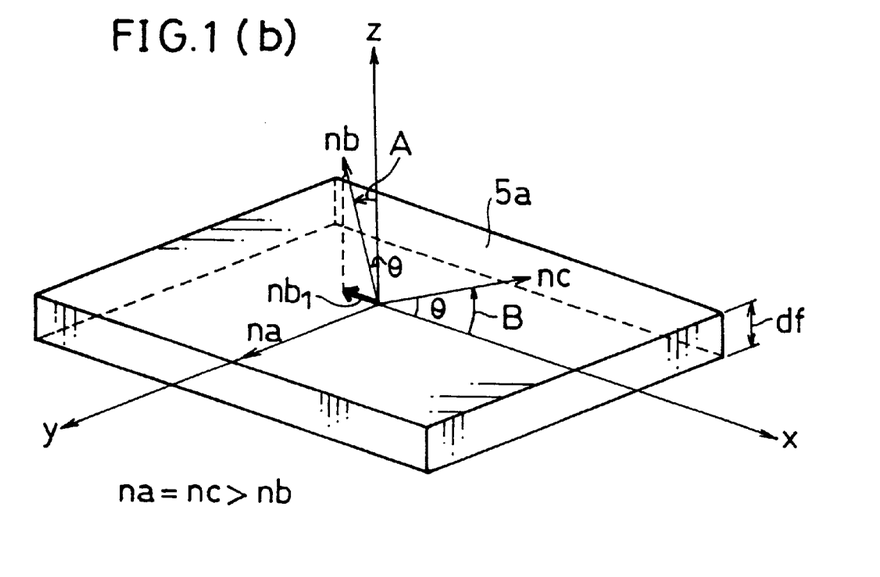
FIG. 1(b) is an explanatory view showing the principal refractive indices of a phase-difference plate of the liquid crystal display device of FIG. 1(a).

As illustrated in FIG. 1(b), the phase-difference plate 5a of the present invention satisfies the relationship na=nc>nb where na, nb and nc are three principal refractive indices of an index ellipsoid, i.e., the relationship that exhibits negative index anisotropy. Moreover, it is necessary to arrange a state in which the direction of the principal refractive index nb is inclined with respect to a direction normal to a surface of the phase-difference plate, and at least the direction of one of the principal refractive indices na and nc is inclined with respect to the a direction parallel to the surface of the phase-difference plate.

More specifically, as shown in FIG. 1(b), it is preferred that the principal refractive index nb is inclined so that the index ellipsoid rotates on the axis of the direction of the principal refractive index na or nc.

The following description will explain in detail the inclined state of the principal refractive index nb. If a rectangular coordinate system xyz in which the xy-plane is assigned to the surface of the phase-difference plate 5a is defined, the direction of the principal refractive index nb is inclined an angle of θ from the z-axis direction normal to the surface of the phase-difference plate 5a toward a direction shown by arrow A in the xz-plane. Similarly, the direction of the principal refractive index nc is inclined an angle of θ from the x-axis direction parallel to the surface of the phase-difference plate 5a toward a direction shown by arrow B in the xz-plane.

The inclination of the principal refractive index nb is given by a direction indicated by arrow $nb_1$ on the x-axis when projected onto the surface of the phase-difference plate 5a. Similarly, in the phase-difference plate 5b, the inclination of the principal refractive index nb is given by a direction indicated by arrow $nb_2$ (shown in FIG. 1(a)).

Thus, in the phase difference plate 5a, supposing that the directions shown by arrows A and B are the clockwise direction about the y-axis when viewed from the negative direction of the y-axis, the direction of the principal refractive index nb is turned in the clockwise direction an angle of θ on the axis of the direction of the principal refractive index na parallel to the surface of the phase-difference plate 5a (shown as the y-axis) from a state in which the direction of the principal refractive index nb is parallel to the z-axis of the normal direction, and simultaneously the direction of the principal refractive index nc is turned in the clockwise direction an angle of θ from a state in which the direction of the principal refractive index nc is parallel to the x-axis direction which is parallel to the surface of the phase-difference plate 5a and perpendicular to the y-axis. In short, the phase-difference plate 5a is constructed so that the index ellipsoid formed by the principal refractive indices na, nb and nc is in an inclined state.

The inclination of the index ellipsoid can be arranged by rotating the index ellipsoid not only on an axis that is the direction of the principal refractive index na, but also on an axis that is the direction of the principal refractive index nc when the direction of the principal refractive index nc is made parallel to the X-axis.

When the index ellipsoid is rotated on the axis of the direction of the principal refractive index na, the directions of the principal refractive indices nb and nc can be inclined toward not only the clockwise direction, but also the counterclockwise direction. Similarly, when the index ellipsoid is rotated on the axis of the direction of the principal refractive index nc, the principal refractive indices na and nb can be inclined toward not only the clockwise direction but also the counterclockwise direction. In any event the index ellipsoid representing the phase-difference plate 5a as a whole needs to be inclined toward the clockwise or counterclockwise direction with respect to the axis of one of the directions of the principal refractive indices, which is parallel to the x-axis or y-axis of the surface (xy-plane) of the phase-difference plate 5a.

Furthermore, when the angle θ of inclination of the principal refractive index nb, i.e., the inclination angle θ of the index ellipsoid, is within a range $15° \leq θ \leq 75°$, the effect produced by the phase-difference plate 5a of the present invention is ensured irrespectively of whether the index ellipsoid is inclined toward the clockwise or counterclockwise direction. Since the phase-difference plate 5b has the same structure as the phase-difference plate 5a, the explanation thereof is omitted here.

The phase-difference plate 5a•5b is fabricated by applying discotic liquid crystals to a transparent support body (for example, triacetyl cellose (TAC), etc.) and orienting the discotic liquid crystals in an oblique-aligned state or a hybrid-aligned state to achieve crosslinking.

As the support body of the phase-difference plate 5a•5b, the triacetyl cellose (TAC) that is generally considered highly reliable and often used for polarizing plates is suitable. Other suitable materials are colorless transparent organic polymer films with excellent environment resistance and chemical resistance, such as polycarbonate (PC) and polyethylene terephthalate (PET).

In a liquid crystal display device 1 according to this embodiment, as shown in FIG. 1(a), the phase-difference plate 5a•5b is present between a polarizing plate 6 and a liquid crystal display element 4, or/and between a polarizing plate 7 and the liquid crystal display element 4. In this structure, the phase-difference plate 5a•5b can compensate for the phase difference between an ordinary ray and an extraordinary ray that varies according to the viewing angle.

Namely, the liquid crystal display device 1 needs to include at least one piece of the phase-difference plate 5a or 5b having the above-mentioned structure between the liquid crystal display element 4 and the polarizing plate 6•7.

In the liquid crystal display device 1, it is necessary to determine a combination of the phase-difference plate 5a•5b and the retardation $\Delta n \cdot d$ of the liquid crystal layer of the liquid crystal display element 4. The retardation $\Delta n \cdot d$ of the liquid crystal layer that can most effectively compensate for a variation in the phase difference when combined with the phase-difference plate 5a•5b is more than 300 nm but less than 550 nm according to examples presented later.

Thus, if the liquid crystal display device 1 is fabricated by combining the phase-difference plate 5a•5b in which the principal refractive index nb among the three refractive indices na, nb and nc of the index ellipsoid is inclined with the liquid crystal display element 4 having the liquid crystal layer with retardation $\Delta n \cdot d$ of more than 300 nm but less than 550 nm, it is possible to compensate for the phase difference between an ordinary ray and an extraordinary ray that varies according to the viewing angle, and significantly improve the quality of the displayed image.

In the phase-difference plate 5a•5b, as shown in FIG. 1(a), it is preferred to arrange the inclination direction $nb_1 \cdot nb_2$ of the principal refractive index nb projected onto the surface of the phase-difference plate 5a•5b to be parallel to the absorption axis 6a•7a of the polarizing plate 6•7 and the rubbing direction 2a•3a of the liquid crystal display element 4.

By arranging the inclination direction $nb_1 \cdot nb_2$ of the principal refractive index nb, the rubbing direction 2a•3a and the absorption axis 6a•7a of the polarizing plate 6•7 in the above-mentioned manner, it is possible to further prevent various phenomena associated with the viewing angle.

Moreover, the inclination direction $nb_1$ of the principal refractive index nb of the phase-difference plate 5a is preferably parallel to the absorption axis 6a of the polarizing plate 6 and opposite to the rubbing direction 2a of the adjacent glass substrate 2. Similarly, the inclination direction $nb_2$ of the principal refractive index nb of the phase-difference plate 5b is preferably parallel to the absorption axis 7a of the polarizing plate 7 and the same as the rubbing direction 3a of the adjacent glass substrate 3.

By setting the inclination direction $nb_1 \cdot nb_2$ of the principal refractive index nb, the rubbing direction 2a•3a and the absorption axis 6a•7a of the polarizing plate 6•7 in the above-mentioned manner, it is possible to prevent various phenomena associated with the viewing angle most effectively. Additionally, as a pair of the phase-difference plates 5a and 5b and the polarizing plates 6 and 7, which are respectively disposed to face each other with the liquid crystal display element 4 therebetween, it is possible to attach the same phase-difference plates and the same polarizing plates to both sides of the liquid crystal display element 4 under the same conditions. Consequently, the fabrication process of the liquid crystal display device 1 is simplified, thereby lowering the cost.

Figure 2:
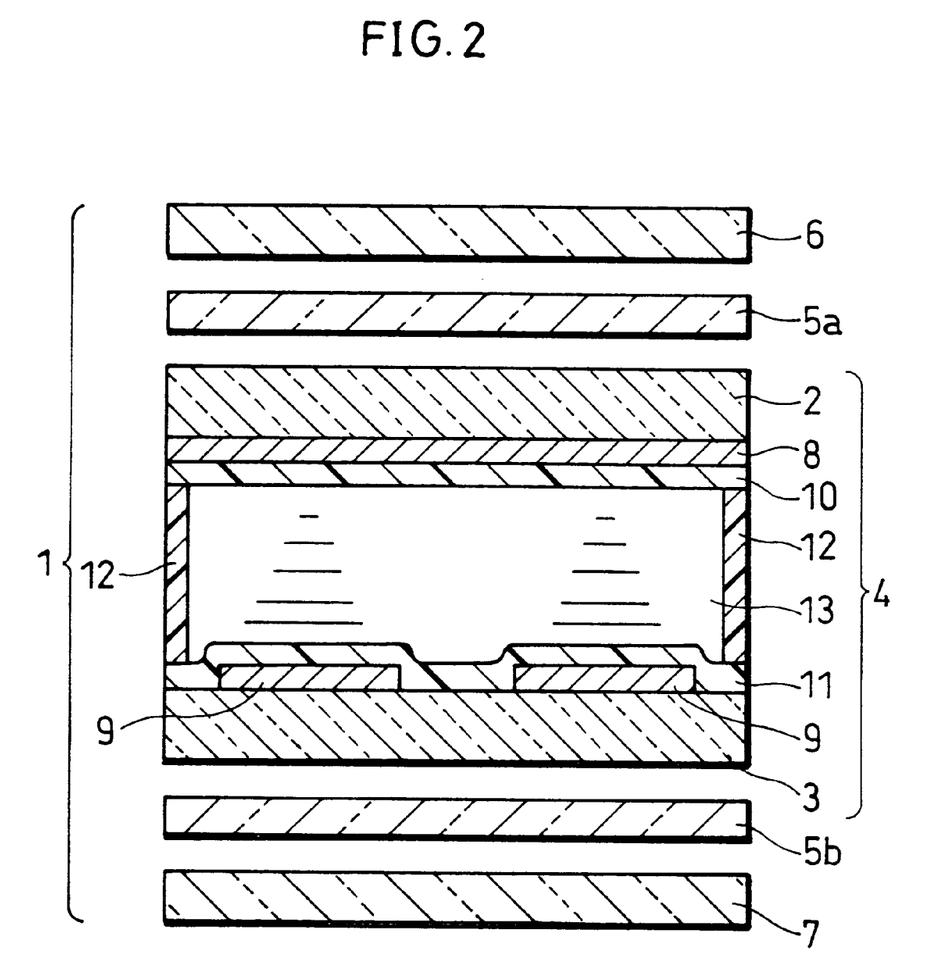
FIG. 2 is an exploded cross section of the liquid crystal display device of FIG. 1(a).

As illustrated in FIG. 2, the liquid crystal display device 1 of this embodiment is constructed by disposing the phase-difference plates 5a and 5b on each side of the liquid crystal display element 4, respectively, and placing a pair of the polarizing plates 6 and 7 to sandwich the phase-difference plates 5a and 5b. In this structure, it is not necessarily to provide both of the phase-difference plates 5a and 5b. Namely, it is possible to use only one phase-difference plate 5a or 5b as mentioned above. Alternatively, in the above-mentioned structure, it is possible to use more than one piece of the phase-difference plate 5a and more than one piece of the phase-difference plate 5b.

The liquid crystal display element 4 is constructed by forming transparent electrode layers 8•9 made of, for example, ITO (indium tin oxide), and alignment films 10•11 made of polyimide, polyvinyl alcohol, etc., in this order on the surfaces of a pair of the glass substrates 2 and 3, respectively, and by sealing a liquid crystal layer 13 made of, for example, nematic liquid crystals between the pair of the glass substrates 2 and 3 with a sealing material 12 made of a resin.

The surfaces of the alignment films 10•11 are rubbed in advance so that the sealed liquid crystal molecules are aligned at about 90°-twisted state. In FIG. 1(a), the rubbing direction 2a represents the rubbing direction of the alignment film 10, and the rubbing direction 3a is the rubbing direction of the alignment film 11.

Figure 3:
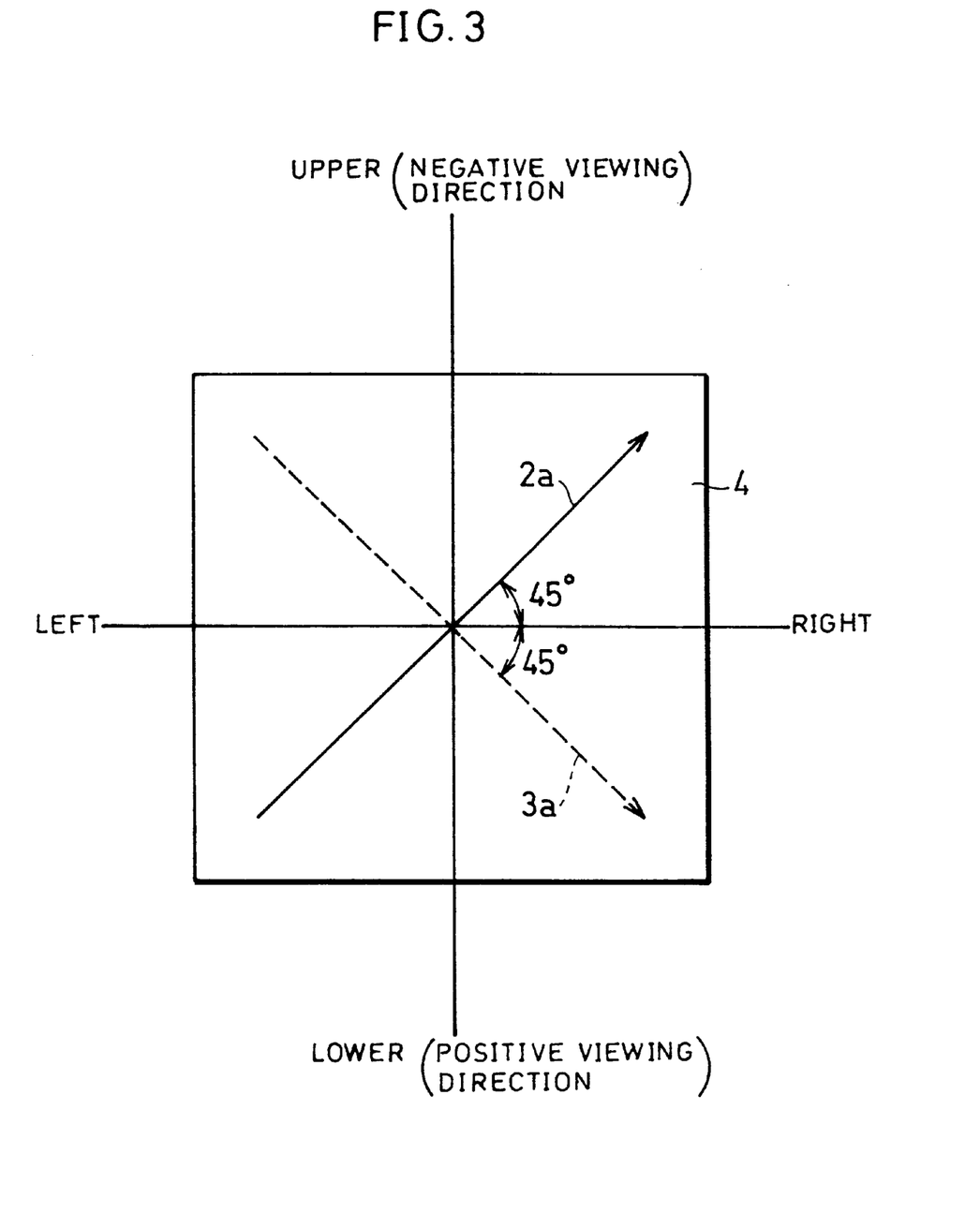
FIG. 3 is an explanatory view showing the rubbing directions of alignment films of a liquid crystal display element.

In the liquid crystal display element 4, as illustrated in FIG. 3, the rubbing direction 2a and the rubbing direction 3a cross each other at a right angle. The rubbing direction 2a inclines 45° from a right direction of the screen toward a negative viewing direction, while the rubbing direction 3a inclines 45° from the right direction of the screen toward the positive viewing direction.

As described above, the liquid crystal display device 1 of the present invention can eliminate the phase difference that occurs in the liquid crystal display element 4 according to the viewing angle by making negative refractive index anisotropy and inclining the principal refractive index nb of the index ellipsoid of the phase-difference plate 6•7. In particular, by setting the inclination directions $nb_1 \cdot nb_2$ of the principal refractive indices nb, the rubbing directions 2a•3a and the absorption axes 6a•7a of the polarizing plates 6•7 in the above-mentioned manner, the phase difference is eliminated more effectively.

Accordingly, the liquid crystal display device 1 of the present invention can further increase the contrast ratio in the black-and-white display and significantly improve the display quality. Moreover, it is possible to prevent the lowering of the contrast ratio in the negative viewing direction and the inversion and coloring phenomena in the right and left directions in the liquid crystal display element 4, thereby displaying high-quality images.

EXAMPLES

The following description will explain in detail specific examples of the above-mentioned liquid crystal display device 1, and the results of measuring the viewing angle dependence thereof.

First, a method of measuring the viewing angle dependence of the liquid crystal display device 1 of this example will be explained.

Figure 4:
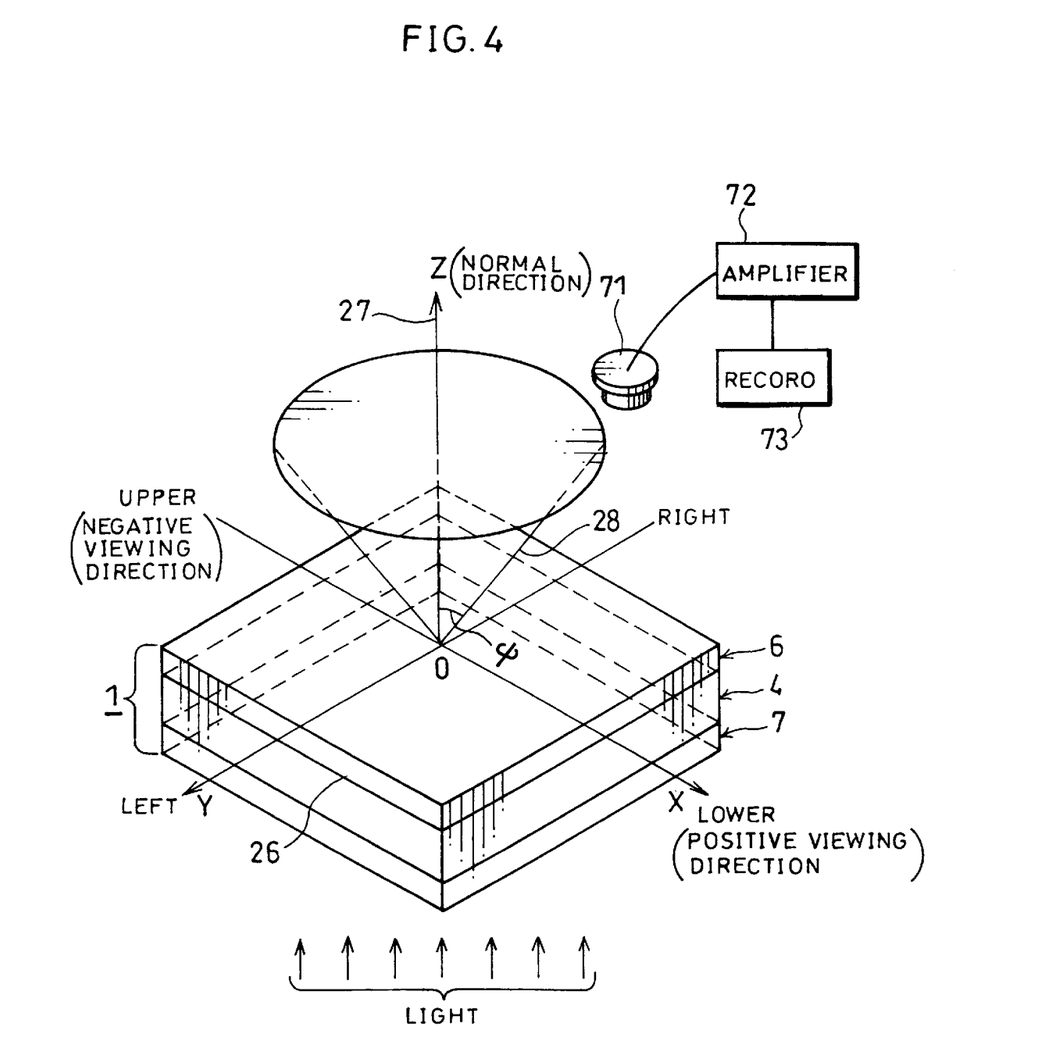
FIG. 4 is a schematic perspective view showing a measuring system for measuring the viewing angle dependence of the liquid crystal display device.

According to a measuring system for measuring the viewing angle dependence of the liquid crystal display device 1, as shown in FIG. 4, the reference xy-plane of a rectangular coordinate system xyz is assigned to a contact plane 26 of the liquid crystal display element 4 and the polarizing plate 6 constituting the liquid crystal display device 1. In FIG. 4, the phase-difference plates 5a•5b are omitted.

Next, a light-receiving element 71 that is an element capable of receiving light with a constant stereoscopic light-receiving angle is placed at a position a predetermined distance apart from the coordinate origin in a direction 28 which forms an angle ψ with a normal direction 27 to the contact plane 26. Monochromatic light with a wavelength of 550 nm is applied to the liquid crystal display device 1 from the polarizing plate 7 side. The output of the light-receiving element 71 is amplified to a predetermined level by an amplifier 72, and recorded by a recording means 73 such as a waveform memory and recorder. The measurements are carried out from three directions, namely the upper direction (negative viewing direction), right direction and left direction.

For the liquid crystal display element 4 of the liquid crystal display device 1, liquid crystal layers formed by nematic liquid crystal materials with retardation Δn·d of 320 nm, 420 nm, and 520 nm, respectively, were used in these examples.

For the phase-difference plates 5a•5b, the following phase-difference plate was used. This phase-difference plate was formed by applying discotic liquid crystals to a transparent support body (for example, triacetyl cellose (TAC)), and orienting the discotic liquid crystals in a hybrid-aligned state to achieve crosslinking. In this phase-difference plate, the value of first retardation that is the product (nc−na)×$d_f$ of the difference between the principal refractive index nc and principal refractive index na, and the thickness $d_f$ of the phase-difference plate 5a•5b shown in FIG. 1(b) is 0 nm. The value of second retardation that is the product (nc−nb)× $d_f$ of the difference between the principal refractive index nc and principal refractive index nb, and the thickness $d_f$ of the phase-difference plate 5a•5b is 100 nm. Moreover, the direction of the principal refractive index nb inclines about 20° from the normal direction to the surface of the phase-difference plate 5a or 5b toward the direction shown by arrow A. Similarly, the direction of the principal refractive index nc inclines about 20° from the surface of the phase-difference plate 5a or 5b toward the direction shown by arrow B.

The phase-difference plates 5a•5b satisfy the condition θ=20° where θ is the angle of inclination of an index ellipsoid of the phase-difference plates 5a•5b.

Such a liquid crystal display device 1 was placed in a measuring system like the one shown in FIG. 4, and the light-receiving element 71 was fixed at an uniform angle ψ. The output level of the light-receiving element 71 with respect to a voltage applied to the liquid crystal display element 4 was measured. The results of the measurement are shown as the transmittance vs. applied voltage characteristics in FIGS. 5(a), 5(b) and 5(c).

Figure 5A:
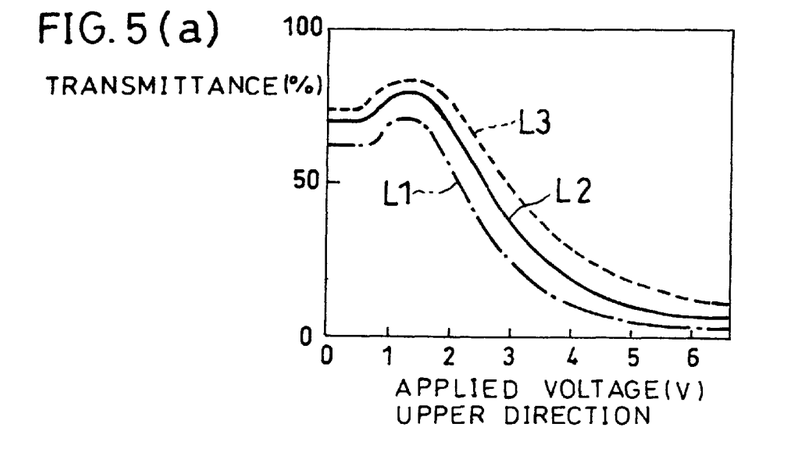
FIG. 5(a) is a graph showing the transmittance vs. applied voltage characteristics of a liquid crystal display device of the present invention when measured from an upper direction (negative viewing direction).

FIG. 5(a) shows the result of a measurement performed from the upper direction in FIG. 3 when the angle (ψ) of the light-receiving element 71 was 50°. Similarly, FIG. 5(b) shows the result of a measurement performed from the right direction in FIG. 3, and FIG. 5(c) is the result of a measurement performed from the left direction in FIG. 3.

Figure 5B:
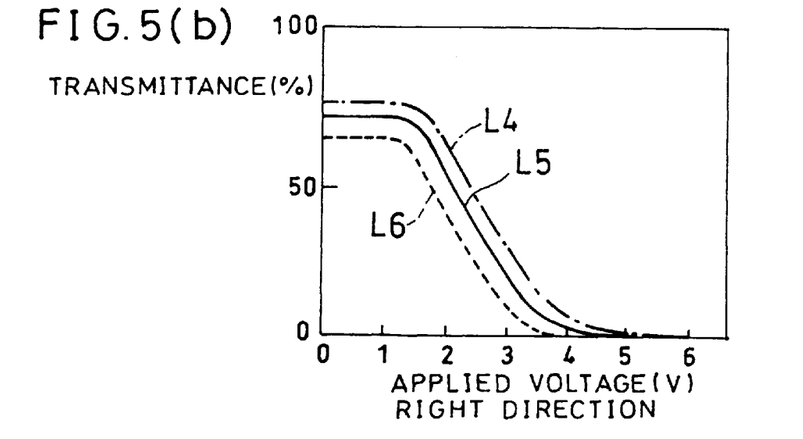
FIG. 5(b) is a graph showing the transmittance vs. applied voltage characteristics of the liquid crystal display device of the present invention when measured from a right direction.
Figure 5C:
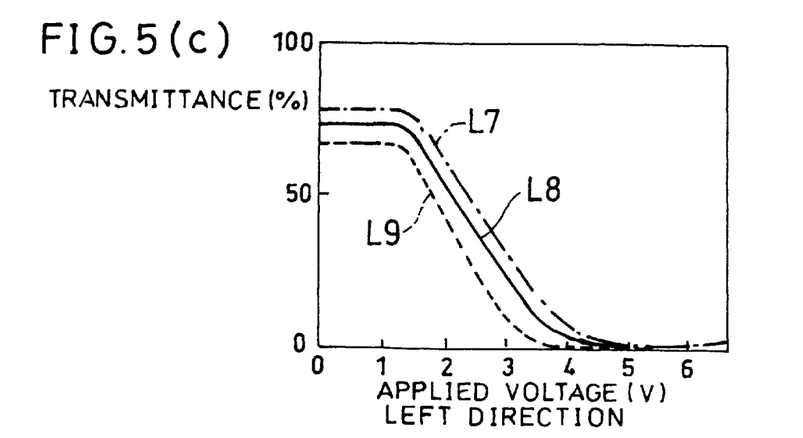
FIG. 5(c) is a graph showing the transmittance vs. applied voltage characteristics of the liquid crystal display device of the present invention when measured from a left direction.

The curves L1, L4, L7 shown by the alternate long and short dash lines in FIGS. 5(a), 5(b), 5(c) indicate the results of measurements when the retardation Δn·d of the liquid crystal layer 13 was 320 nm. Similarly, the curves L2, L5, L8 shown by the solid lines indicate the results of measurements when the retardation Δn·d was 420 nm. The curves L3, L6, L9 shown by the broken lines are the results of measurements when the retardation Δn·d was 520 nm.

As comparative examples to the above-mentioned examples, liquid crystal display devices were prepared using the liquid crystal display element 4 and phase-difference plates 5a•5b having the same structures as in the above-mentioned examples except that the retardation Δn·d of the liquid crystal layer 13 of the liquid crystal element 4 was changed to 300 nm or 550 nm, respectively.

These liquid crystal display devices were placed in the measuring system shown in FIG. 4, and the light-receiving element 71 was fixed at a uniform angle ψ. The output level of the light-receiving element 71 with respect to a voltage applied to the liquid crystal display element 4 of each device was measured in the same manner as mentioned above. The results of the measurements are shown as the transmittance vs. applied voltage characteristics in FIGS. 6(a), 6(b) and 6(c).

Figure 6A:
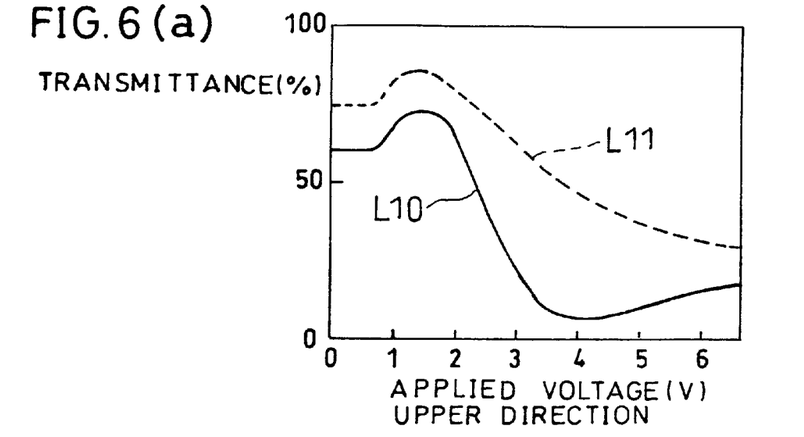
FIG. 6(a) is a graph showing the transmittance vs. applied voltage characteristics of a liquid crystal display device of a comparative example when measured from an upper direction (negative viewing direction).

FIG. 6(a) shows the result of a measurement performed from the upper direction in FIG. 3 when the angle (ψ) of the light-receiving element 71 was 50°. Similarly, FIG. 6(b) shows the result of a measurement performed from the right direction in FIG. 3, and FIG. 6(c) is the result of a measurement performed from the left direction in FIG. 3.

Figure 6B:
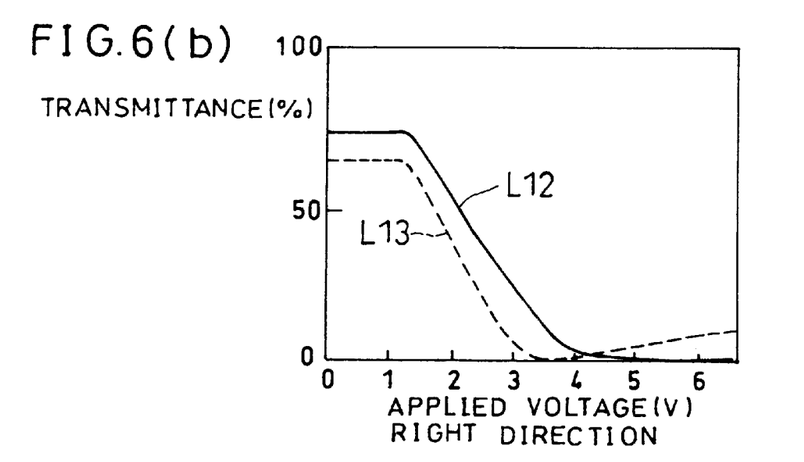
FIG. 6(b) is a graph showing the transmittance vs. applied voltage characteristics of a liquid crystal display device of a comparative example when measured from a right direction.
Figure 6C:
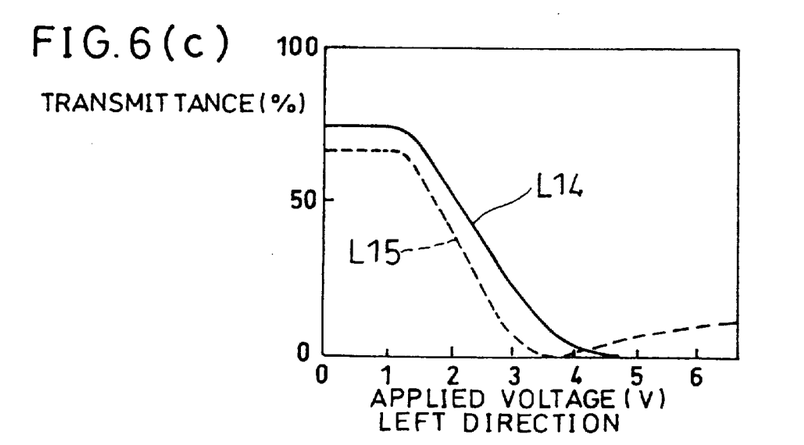
FIG. 6(c) is a graph showing the transmittance vs. applied voltage characteristics of a liquid crystal display device of a comparative example when measured from a left direction.

The curves L10, L12, L14 shown by the solid lines in FIGS. 6(a), 6(b), 6(c) indicate the results of measurements when the retardation Δn·d of the liquid crystal layer 13 was 300 nm. Similarly, the curves L11, L13, L15 shown by the broken lines are the results of measurements when the retardation Δn·d of the liquid crystal layer 13 was 550 nm.

The transmittance vs. applied voltage characteristics measured from the upper direction (negative viewing direction) of these liquid crystal display devices were compared with each other. It was confirmed that the transmittance was sufficiently lowered in all of L1, L2 and L3 of FIG. 5(a) by the application of voltage. By contrast, in FIG. 6(a), even when the applied voltage was increased, the transmittance was not sufficiently lowered in L11 as compared to L1, L2 and L3 of FIG. 5(a). Moreover, in L10, an inverting phenomenon in which the transmittance was once lowered with the increase in the applied voltage and then rises again was confirmed.

Next, the transmittance vs. applied voltage characteristics measured from the right direction of the respective liquid crystal display devices were compared with each other. It was confirmed from FIG. 5(b) that the transmittance was lowered to substantially zero in all of L4, L5 and L6 with the increase in the applied voltage. Similarly, in FIG. 6(b), the transmittance was lowered to substantially zero in L12 like FIG. 5(b) with the increase in the applied voltage, and the inverting phenomenon was confirmed in L13.

When the transmittance vs. applied voltage characteristics of the respective liquid crystal devices were measured from the left direction, like the characteristics measured from the right direction, the transmittance was lowered to substantially zero in all of L7, L8 and L9 of FIG. 5(c) and L14 of FIG. 6(c) with the increase in the applied voltage, and the inverting phenomenon was confirmed only in L15 of FIG. 6(c).

Liquid crystal display devices were prepared by changing the value of the retardation Δn·d of the liquid crystal layer 13 of the liquid crystal display element 4 to 300 nm, 320 nm, 420 nm, 520 nm, and 550 nm, and observed under white light.

When the retardation Δn·d of the liquid crystal layer 13 was set to 320 nm, 420 nm, and 520 nm, coloring was not confirmed even when the liquid crystal display devices are viewed from an inclined viewing angle. Namely, good image quality was obtained.

However, in the liquid crystal display device in which the retardation Δn·d of the liquid crystal layer 13 was set to 300 nm, when the liquid crystal display device was viewed from an inclined viewing angle, the displayed image was colored red at the time the voltage was switched on. On the other hand, when the liquid crystal display device in which the retardation Δn·d of the liquid crystal layer 13 was set to 550 nm was viewed from an inclined viewing angle, the displayed image was colored yellow to orange at the time the voltage was switched off.

As described above, in the examples shown in FIGS. 5(a), 5(b) and 5(c) where the retardation Δn·d of the liquid crystal layer 13 was set to 320 nm, 420 nm, and 520 nm, respectively, the transmittance was sufficiently lowered with the increase in the applied voltage, and the inverting phenomenon was not observed. Thus, it is understood that such a liquid crystal display device allows a wider viewing angle, prevents the coloring phenomenon, and significantly improves the display quality. In particular, it is understood from FIG. 5(a) that a satisfactory lowering of the transmittance is achieved when the retardation Δn·d of the liquid crystal layer 13 is not more than 420 nm.

On the other hand, in the comparative examples, it is understood from the results shown in FIGS. 6(a), 6(b) and 6(c) that the viewing angle dependence is not sufficiently improved if the retardation Δn·d of the liquid crystal layer 13 is not more than 300 nm or not less than 550 nm.

A liquid crystal display device 1 including a phase-difference plates 5a•5b formed by orienting discotic liquid crystals in an oblique-aligned state on a transparent support body was measured in the same manner as above. The same results as above were obtained. Moreover, when the inclination angle θ of the index ellipsoid of the phase-difference plate 5a•5b was within a range 15°≦θ≦75°, the transmittance vs. applied voltage characteristics of the liquid crystal display device 1 did not change irrespectively of the state of alignment of the discotic liquid crystals of the phase-difference plate 5a•5b.

As described above, in order to improve the viewing angle dependence of a liquid crystal display device and achieve higher quality, in a liquid crystal display device provided with at least one piece of phase-difference plate between a liquid crystal display element and a polarizer, it is possible to use a phase-difference plate which satisfies a relationship na=nc>nb where na, nb and nc are three principal refractive indices of an index ellipsoid, one of the principal refractive indices na and nc being parallel to the surface of the phase-difference plate, the index ellipsoid being inclined by turning the direction of the principal refractive index nb clockwise or counterclockwise on the axis of the direction of the parallel principal refractive index from a state in which the principal refractive index nb is parallel to the normal direction to the surface of the phase-difference plate into an inclined state. In this case, the value of retardation Δn·d of a liquid crystal layer of the liquid crystal display element is preferably more than 300 nm but less than 550 nm, more preferably within a range of from 320 nm to 520 nm, and most preferably within a range of from 320 nm to 420 nm.

By setting the retardation Δn·d of the liquid crystal layer of the liquid crystal display element within the range of from 320 nm to 520 nm, it is possible to effectively eliminate the phase difference occurred in the liquid crystal display element according to the viewing angle. Therefore, it is possible to certainly prevent a contrast change, the inverting phenomenon and coloring phenomenon in the right and left directions on the liquid crystal display image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
   a liquid crystal display element formed by sealing a liquid crystal layer in a space between a pair of light transmitting substrates having transparent electrode layers and alignment films on their facing surfaces, said liquid crystal layer being formed by a liquid crystal material so that a value Δn·d that is a product of index anisotropy Δn of the liquid crystal material and a thickness d of said liquid crystal layer is more than 300 nm but less than 500 nm;
   a pair of polarizers disposed on both sides of said liquid crystal display element; and
   at least one phase-difference plate between said liquid crystal display element and at least one of said pair of polarizers, wherein said phase-difference plate satisfies na=nc>nb where na, nb and nc represent three principal refractive indices of an index ellipsoid, a direction of one of the principal refractive indices na and nc is parallel to a surface of the phase-difference plate, and the index ellipsoid is inclined by rotating a direction of the principal refractive index nb clockwise or counterclockwise about an axis that is a direction of the principal refractive index na or nc parallel to the surface of said phase-difference plate from a state parallel to a normal direction to the surface of said phase-difference plate into an inclined state, and where an inclining direction of the principal refractive index nb of said at least one phase-difference plate projected onto a surface of said phase-difference plate adjacent to one of said pair of light transmitting substrates is parallel to a rubbing direction of said one light transmitting substrate, and that an inclining direction of the principal refractive index nb of said phase-difference plate projected onto a surface of said phase-difference plate adjacent to one of said polarizers is parallel to an absorption axis of said one polarizer.

2. The liquid crystal display device as set forth in claim 1, wherein the value Δn·d is within a range of from 320 nm to 520 nm.

3. The liquid crystal display device as set forth in claim 1, wherein the value Δn·d is within a range of from 320 nm to 420 nm.

4. The liquid crystal display device as set forth in claim 3, wherein
   the inclining direction of the principal refractive index nb of one of said pair of phase-difference plates, adjacent to one of said pair of light transmitting substrates, is opposite to the rubbing direction of the light transmitting substrate, and the inclining direction of the principal refractive index nb of the other of said pair of phase-difference plate, adjacent to the other of said pair of light transmitting substrates, is the same as the rubbing direction of the other light transmitting substrate.

5. The liquid crystal display device as set forth in claim 1, wherein an angle of inclination of the index ellipsoid is between 15° and 75°.

6. The liquid crystal display device as set forth in claim 1, wherein said phase-difference plate is placed between said liquid crystal display element and each of said polarizers.

7. The liquid crystal display device as set forth in claim 1, wherein said phase-difference plate has a first retardation value of 0 nm, and a second retardation value of 100 nm, the first retardation value being a product $(nc-na)d_f$ of a thickness $d_f$ of said phase-difference plate and a difference between the principal refractive index nc and the principal refractive index na, the second retardation value being a product $(nc-nb)d_f$ of the thickness $d_f$ and a difference between the principal refractive index nc and the principal refractive index nb.

8. The liquid crystal display device as set forth in claim 1, wherein each of said at least one phase-difference plates is formed in more than one piece and is placed between said liquid crystal display element and each of said polarizers.

9. The liquid crystal display device as set forth in claim 1, wherein rubbing directions of said alignment films formed on the facing surfaces of the pair of said light transmitting substrates cross each other at a right angle.

10. The liquid crystal display device as set forth in claim 9, wherein one of the rubbing directions of said alignment films formed on the facing surfaces of said pair of light transmitting substrates is inclined 45° from a right direction of a screen of said liquid crystal display element toward a negative viewing direction, and the other of the rubbing directions is inclined 45° from the right direction of said screen toward a positive viewing direction.

11. The liquid crystal display device as set forth in claim 1, wherein absorption axes of the pair of said polarizers cross each other at a right angle.

12. The liquid crystal display device as set forth in claim 1, wherein the liquid crystal material used for said liquid crystal layer is a nematic liquid crystal.

13. A liquid crystal display device comprising:

a liquid crystal display element formed by sealing a liquid crystal layer in a space between a pair of light transmitting substrates each having a transparent electrode layer and alignment film on their facing surfaces, said liquid crystal layer being formed by a liquid crystal material so that a value $\Delta n \cdot d$ that is a product of index anisotropy $\Delta n$ and a thickness of d of said liquid crystal layer is more than 300 nm but less than 500 nm;

a pair of polarizers disposed on both sides of said liquid crystal display element; and at least one phase-difference plate placed between said liquid crystal element and said pair of polarizers, wherein said phase-difference plate satisfies na=nc>nb where na, nb and nc represent three principal refractive indices of an index ellipsoid, a direction of the principal refractive index nb is inclined with respect to a direction normal to a surface of said phase-difference plate, and at least a direction of one of the principal refractive indices na and nc is inclined with respect to a direction parallel to the surface of said phase-difference plate, and where an inclining direction of the principal refractive index nb of said at least one phase-difference plate projected onto a surface of said phase-difference plate adjacent to one of said pair of light transmitting substrates is parallel to a rubbing direction of said one light transmitting substrate, and that an inclining direction of the principal refractive index nb of said phase-difference plate projected onto a surface of said phase-difference plate adjacent to one of said pair of polarizers is parallel to an absorption axis of said one polarizer.

* * * * *